United States Patent [19]
Chauffour et al.

[11] Patent Number: 5,519,703
[45] Date of Patent: May 21, 1996

[54] METHOD AND APPARATUS FOR CONFORMING THE SPEED OF A CALLED TERMINAL ADAPTER TO THE SPEED OF A CALLING TERMINAL ADAPTER

[75] Inventors: Pascal Chauffour, Saint Laurent Du Var; Michel Froissart, Cagnes Sur Mer; Dominique Vinot, La Gaude, all of France

[73] Assignee: International Business machines Corporation, Armonk, N.Y.

[21] Appl. No.: 368,070

[22] Filed: Jan. 3, 1995

[30] Foreign Application Priority Data

Jan. 14, 1994 [EP] European Pat. Off. ............. 94480006

[51] Int. Cl.⁶ .................................................. H04L 7/10
[52] U.S. Cl. ..................... 370/84; 370/105.1; 370/105.4; 370/110.1; 375/222
[58] Field of Search ................................. 370/84, 79, 82, 370/102, 100.1, 105.1, 105.2, 110.1; 375/222; 379/93, 96; 371/5.4; 358/434

[56] References Cited

U.S. PATENT DOCUMENTS

| | | | |
|---|---|---|---|
| 4,931,250 | 6/1990 | Greszczuk | 375/222 |
| 4,956,852 | 9/1990 | Hodge | 375/222 |
| 5,247,546 | 9/1993 | Abbiate et al. | 370/84 |
| 5,335,225 | 8/1994 | Brax | 370/84 |
| 5,369,636 | 11/1994 | Ueno et al. | 370/84 |
| 5,448,560 | 9/1995 | Chen et al. | 370/84 |

FOREIGN PATENT DOCUMENTS

| | | | |
|---|---|---|---|
| 0429262 | 11/1990 | European Pat. Off. | H04Q 11/04 |
| 0461859 | 6/1991 | European Pat. Off. | H04N 1/32 |
| 3922658 | 7/1989 | Germany | H04M 11/00 |

OTHER PUBLICATIONS

Globecom '89, Session 54, Paper 3, vol. 3, 27 Nov. 1989, Texas, US; pp. 1–7, XP000144859 W. D. Grove et al. 'Turbo–loop: A Rate–Adaptive Digital Subscriber Loop (RA–DSL) for Advanced ISDN Access Applications'.

IEEE Journal on Selected Areas in Communication, vol. 7, No. 7, Sep. 1989, New York US pp. 1034–1042, XP000054534 W. M. Harman et al. 'ISDN Protocols for Connection Control'.

*Primary Examiner*—Hassan Kizou
*Assistant Examiner*—Seema S. Rao
*Attorney, Agent, or Firm*—Gerald R. Woods

[57] ABSTRACT

Method for automatically adapting and configuring the speed of a terminal adapter (30) to the rate 56 Kbps or 64 Kbps which is used by a calling adapter (20). After sending the CONNECT message via the ISDN NETWORK to the calling terminal adapter (20) in accordance with CCITT Q.931 Recommendations, the called TA (30) is initialized to a rate of 64 Kbps and then continuously transmits (204) an alignment pattern ALL_ONES while starting a first timing process (T1). This first timing process will cause the called TA to switch to a 56 Kbps speed if the 64 Kbps validation process does not succeed. The method then involves the step of checking (206) the reception of a ALL_ZEROS pattern coming from said calling adapter (20) before the end of said first predetermined period (T1). If this case, a 64 Kbps validation process will be performed which comprises the checking whether a ALL_ONES pattern is received within a second period (T2), in which case the 64 Kbps rate configuration will be validated. On the contrary, if the ALL_ZEROS pattern is not received at the end of the first period (T1), a 56 Kbps rate validation process is initiated which is based on the detection of a so-called 56 Kbps pattern within the data flow. The 56 Kbps pattern is defined as being a number of n bytes with the first bit of every byte being set to a one. Additionally, the 64 Kbps validation process involves the checking (210) of the continuous receiving of said ALL_ZEROS pattern during said first period (T1) as long as the ALL_ONES pattern is not yet received, and at the end of said first period (T1) validating (209, 213) the 64 Kbps rate.

6 Claims, 3 Drawing Sheets

METHOD AND APPARATUS FOR CONFORMING THE SPEED OF A CALLED TERMINAL ADAPTER TO THE SPEED OF A CALLING TERMINAL ADAPTER

TECHNICAL FIELD OF THE INVENTION

This invention relates to data transmission and more particularly to equipments which are designed to be connected to an Integrated Services Digital Network (ISDN).

BACKGROUND ART

ISDN is expected to be a rapidly expanding branch in the data communicating field as it allows the possibility of high-rate communications in the near future, particularly for sending voice, data etc.

FIG. 1 shows an example of ISDN connections. A calling terminal adapter 20 allows the connection of a Data Terminating Equipment (DTE) 10 to I.S.D.N. telecommunication network 50.

In the considered example, a calling terminal adapter 20, assumed to be a telecommunication equipment located within the United States of America, is designed to be connected to the well-known AT&T ACCUNET network. With this assumption, Terminal adapter 20 is capable of handling 56 Kbps links and utilizes the well known I.S.D.N numbering plan. A second Terminal Adapter 60 is also connected to the network 50 and is assumed to be an ISDN terminal adapter capable of handling 64 Kbps. At last, a third terminal adapter 30 allows the connection of a DTE 40 to the network.

Therefore, it appears that when one call is received by one terminal Adapter, e.g. adapter 30, the latter needs to recognize the rate and accordingly adapts its own speed to that used by the calling party. Indeed, assuming that adapter 20 is the calling one, the called adapter 30 needs to be adapted to a 56 Kbps rate. Conversely, in the case where the calling adapter is adapter 60, the called adapter needs to switch its operating speed to a rate of 64 Kbps.

In the prior art, the switching between the two operating rates was performed manually by the user prior to the call or a user was compelled to buy a series of two distinctive equipments, each one being dedicated to one particular speed.

Therefore, a need has appeared in the telecommunication field for an ISDN equipment which is capable of automatically recognizing and adapting its own speed to either 56 Kbps and 64 Kbps.

SUMMARY OF THE INVENTION

The problem to be solved by the present invention is to provide an ISDN terminal adapter which is capable of recognizing the rate used by a calling adapter, either 56 Kbps or 64 Kbps, and adapts its own speed to this rate.

This problem is solved by the method according to the present invention for automatically adapting and configuring the speed of a terminal adapter (TA) being called to the rate 56 Kbps or 64 Kbps which is used by a calling adapter. Referring both to FIG. 2 and to the message flow representation in FIG. 1, after the sending of the CONNECT message to the ISDN network in accordance with CCITT Q.931 Recommendations, the called TA is initialized to a rate of 64 Kbps and then, continuously transmits (204) an alignment pattern ALL_ONES while starting a first timing process (T1). This first timing process will cause the called TA to switch to a 56 Kbps speed if the 64 Kbps validation process does not succeed at the end of the first period T1. The method involves the step of checking (206) the reception of a ALL_ZEROS pattern coming from said calling adapter (20) before the end of said first predetermined period (T1). If this case, a 64 Kbps validation process is performed which comprises the checking whether a ALL_ONES pattern is actually received within a second period (T2) of a second timing process. Depending on the success of this checking, the validation of the 64 Kbps rate will be confirmed.

On the other hand, if the ALL_ZEROS pattern is not received at the end of the first period T1, the called TA initiates a 56 Kbps rate validation process which is based on the continuous detection of a so-called 56 Kbps pattern in the data flow. The 56 Kbps pattern is assumed to be detected on the occurrence of a sequence of n bytes, with each byte having its first bit being set to a ONE.

Preferably, the 64 Kbps validation process involves the checking (210) of the continuous receiving of said ALL_ZEROS pattern during said first period (T1) as long as the ALL_ONES pattern is not yet received, and at the end of said first period (T1) validating (209, 213) the 64 Kbps rate configuration. This avoids the failing of the rate determination process in some circumstances involving long distance calls where the transmission of the ALL_ONES pattern to the calling TA may require a great deal of time which therefore might delay the receiving of the ALL_ONES pattern in the called adapter.

In a more preferred embodiment of the invention, the 56 Kbps rate validation process comprises the steps of starting a third timing process based on a third period T3 and checking the detection of said 56 Kbps pattern within this third period T3. If this 56 Kbps pattern cannot be detected at the end of this third period T3, the rate configuration is switched back to the 64 Kbps rate configuration. However, in the contrary case, a fourth period T4 is used in order to check whether the 56 Kbps pattern remains present in the data flow for at least the fourth period T4 before the final validation of the 56 Kbps is performed.

DESCRIPTION OF THE PREFERRED EMBODIMENT OF THE INVENTION

The process which is used in accordance with the present invention for determining which speed is used by a calling adapter, is initiated during the establishment of the link between the two terminal adapters, and more accurately during the signalling phase prior to any communication of data. It should be noticed that such a signalling phase is well-known to the skilled man and will not be described with further details. The reader will find more information in the appropriate CCITT Recommendations, and particularly in the Fascicule VIII.2, Rec. X.30.

Basically, the detection of the right rate which is used by the calling adapter is achieved by an appropriate use of a combination of timing processes which will be performed in the OSI layer 1 procedures. Therefore, this allows the possibility to carry out the desired speed detection even in the case where the particular network to which is connected the Terminal Adapter being considered does not provide any information element concerning the speed.

Figure 1:
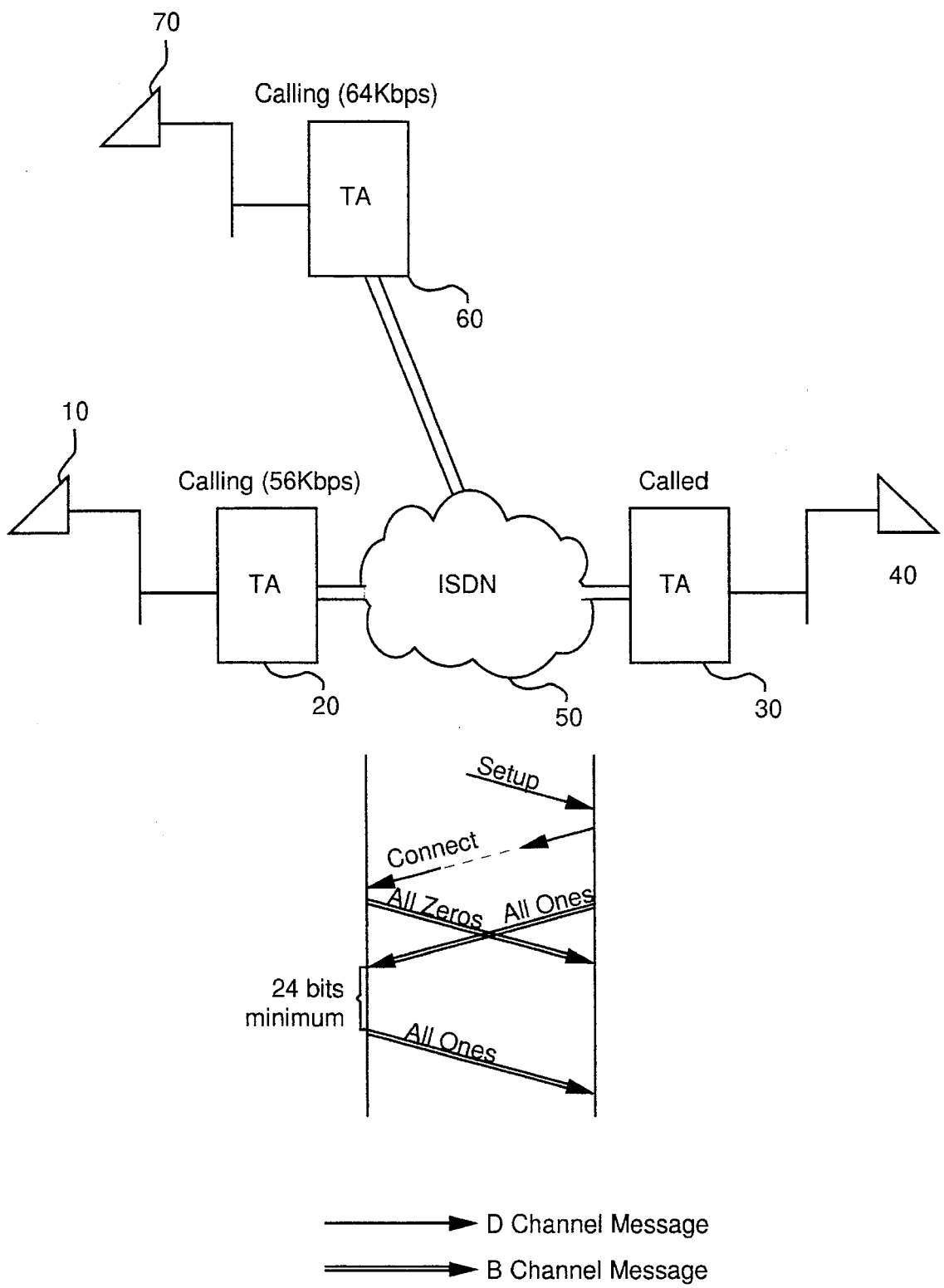
FIG. 1 shows an example of ISDN connection.
Figure 2:
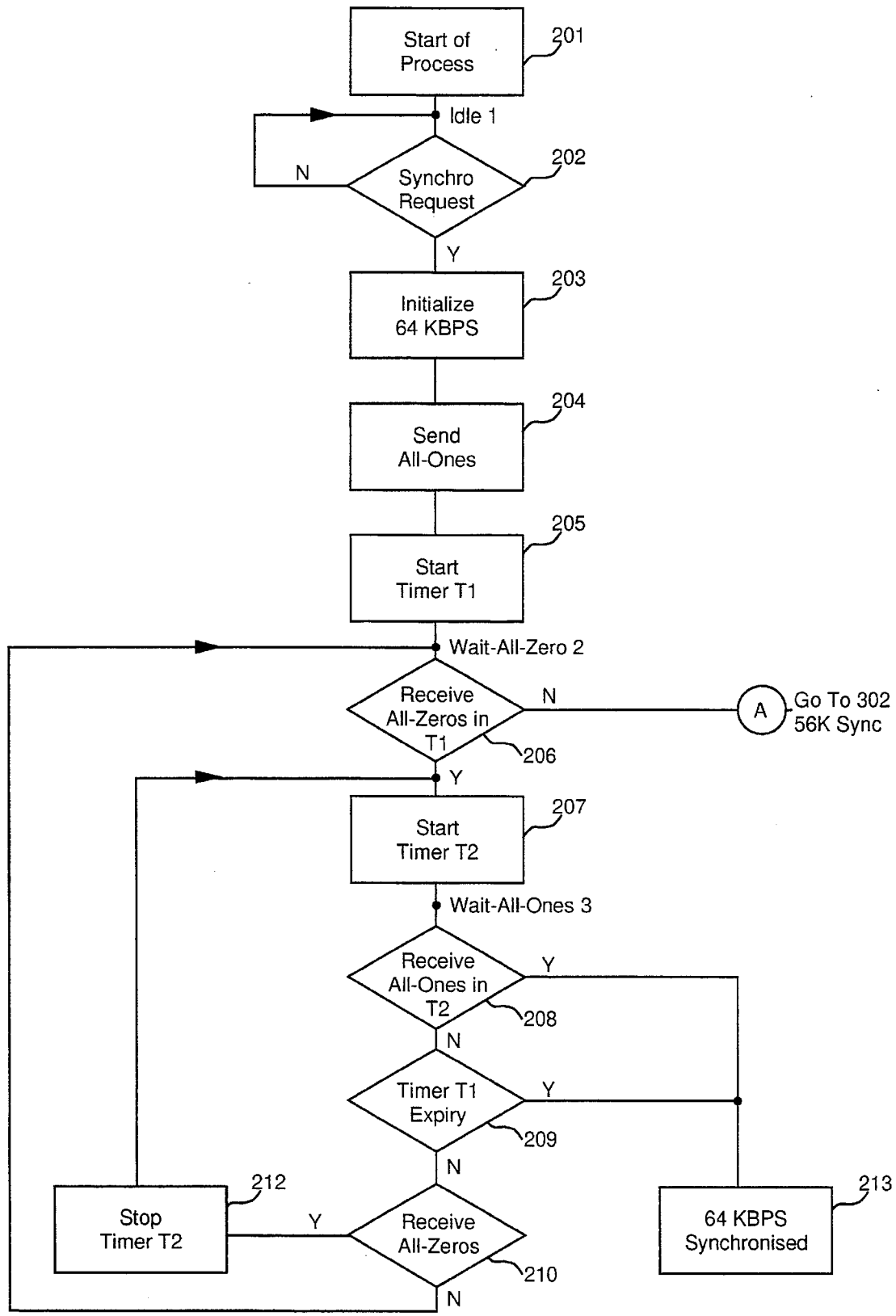
FIGS. 2 and 3 are flow charts illustrating the basic steps which are involved in the method according to the present invention.
Figure 3:
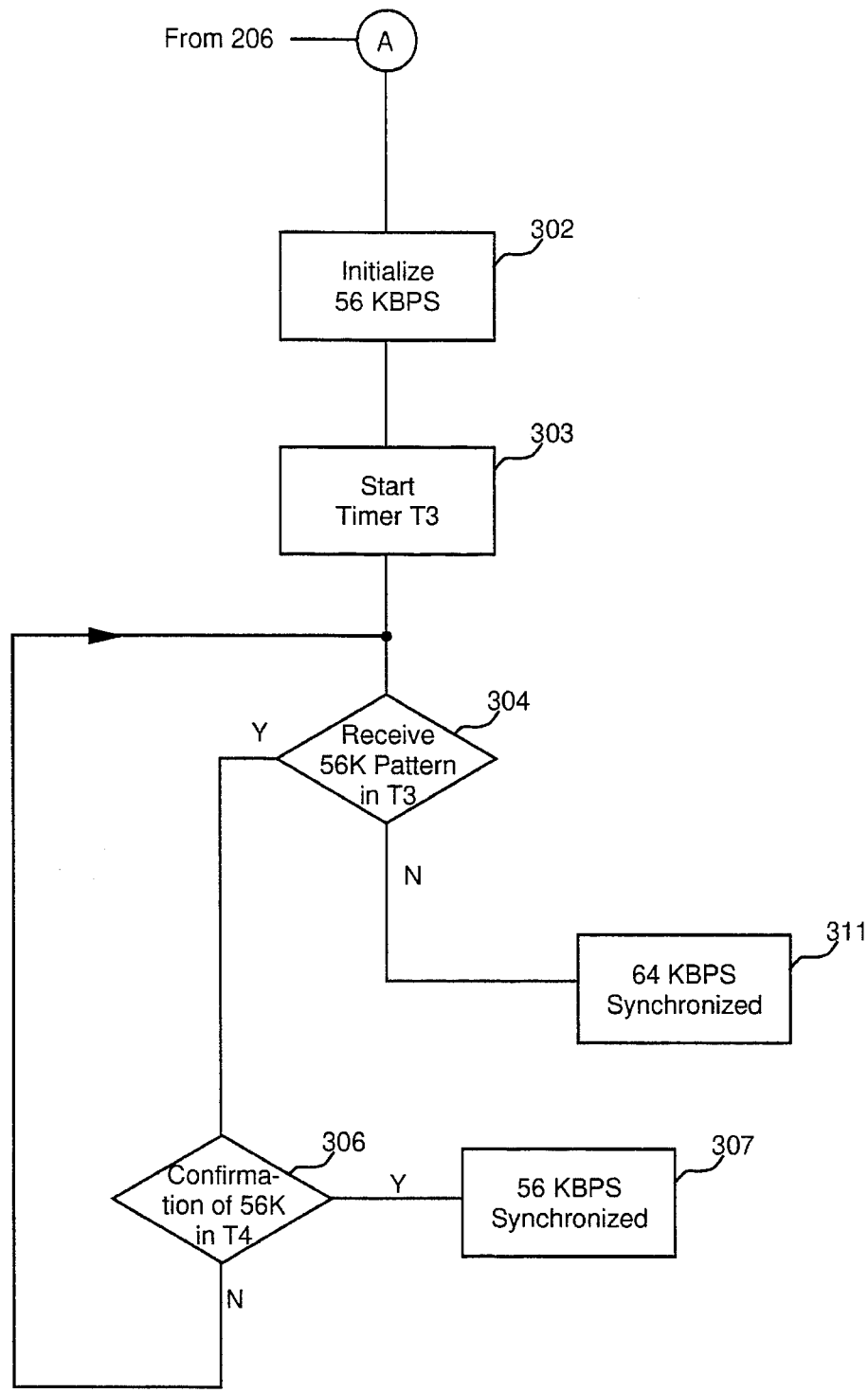

With respect to FIGS. 2 and 3, there is described the succession of steps which are performed for achieved the rate detection. The process is initiated in step 201 on the occurrence of a CONNECT message sent by the called adapter 30. Then an appropriate software routine or primitive, called SYNCHRO REQUEST, which is performed within terminal adapter 30 is called, step 202. It should be understood that the calling process of the latter routine will result in the execution of the technical steps which will be described hereinafter with reference to FIGS. 2 and 3. Then step 203, terminal adapter 30 initializes its own registers and its own operating speed to a 64 Kbps. Then, step 204 and in accordance with the CCITT X.30 Recommendations, the terminal adapter 30 performs the continuous sending of the alignment pattern ALL_ONES on the B-Channel. Simultaneously, with the beginning of the latter sending of the ALL_ONES pattern, the terminal adapter 30 starts an internal timing process in step 205. As it will appear hereinafter, this timing process will be used for switching the rate detection process to a 56 Kbps when no positive result occurs after a predetermined period T1.

Then, step 206, a test is performed to determine whether the ALL_ZERO pattern is received as expected within the above mentioned predetermined period T1. If the ALL_ZERO pattern is actually received by the TA 30 on his allocated B-channel, then the process proceeds to step 207 where the terminal adapter starts a second internal timing process. This timing will be used for confirming that the received pattern is actually a ALL_ZERO pattern. In the reverse case, the process proceeds to step 302 where the rate detection process is switched to a 56 Kbps as will appear below. Step 207 and as mentioned above, the terminal adapter 30 starts a second predetermined timing process T2 which will be used for confirming the receiving of ALL_ONES coming from the Terminal Adapter 20 on the allocated B-channel which, in accordance to the above mentioned CCITT X.30 recommendations, switches to the transmission of a ALL_ONES pattern as soon as it receives the ALL_ONE pattern which was generated in the called terminal adapter (30) in step 204. From this instant adapter 20 continuously transmits the ALL_ONES pattern. Then, step 208, a test is performed to determine whether the terminal adapter 30 has received the first ONES elements of the continuous ALL_ONES synchronization pattern generated by the terminal adapter 20 within the above mentioned predetermined period T2. If this case, the process proceeds to step 213 where the 64 Kbps synchronization is confirmed. In the reverse case, however, where the ALL_ONES pattern is still expected, a test is performed in step 209 to determine whether the above mentioned T1 period is elapsed, in which case the 64 Kbps synchronization process is confirmed. It should be noticed that this case generally occurs for international telecommunications which requires a non-negligible delay before the called terminal adapter 30 receives the ALL_ONES synchronization pattern coming from the calling party. If the timing period T1 has not yet elapsed, a test is performed in step 210 to determine whether the ALL_ZEROS pattern is received within the predetermined period T2. If the latter ALL_ZEROS is received, the process stops the second internal timing process T2, in step 212, and then proceeds to step 207 again for the initiation of a new confirmation process. In the reverse case, i.e. if the ALL_ZEROS is not received during the period T2, the process proceeds to step 206 again. This loop is used for eliminating the occurrence of patterns which might be interpreted by the terminal adapter 30 as being the expected ALL_ZEROS pattern and which are not confirmed.

Now, it will be described the process which is performed after the test 206 in the case where the first predetermined period T1 is elapsed and the expected ALL_ZEROS pattern has not been received. As mentioned above, the process proceeds to step 302 where the terminal adapter 30 is initialized in a 56 Kbps. Then, step 303, a third timing process based on a period T3 is started. As it will appear below, this third period is used for determining the maximum time which will be allowed for confirming the 56 Kbps configuration. In step 304, an analysis is performed on the data received on the allocated B-channel to ascertain that the received frame is structured on the basis of a 56 Kbps. To achieve this, the received frame is checked on every first bit of each byte composing the frame. If the frame appears to be containing a number of n bytes, each one having a first one being set to a one, the latter frame will be considered by the terminal adapter 30 has comprising a 56 Kbps pattern. Therefore, in step 304, a test is performed to determine whether the above mentioned 56 Kbps pattern is received during the third period T3. In this case, the process proceeds to step 306 where an additional confirmation will be performed in order to ascertain that the 56 Kbps pattern is still received during a fourth period T4. If this is true, then the 56 Kbps assumption can be confirmed and the corresponding initialization is validated, step 307.

If the 56 Kbps pattern has not been received after the elapse of the T3 period, the process proceeds to step 311 where the terminal adapter 30 is switched back to a 64 Kbps configuration.

Therefore, it should be noticed that the method in accordance with the present invention processes the 56 Kbps pattern in order to distinguish the actual transmission rate which is effective. This results in the following advantage: no further information, particularly provided by the higher layers is needed to provide the rate adaptation as the lower physical layer is sufficient to achieve this result.

In the preferred embodiment of the invention, the timing T1, T2, T3 and T4 are respectively set on a period of 3 seconds; 80 milliseconds; 2.5 seconds and 1 second approximately.

We claim:

1. For use in a data communication network in which each user is connected to the network through a terminal adapter, a method performed by a called terminal adapter for automatically configuring its speed to one of the two possible speeds at which a calling adapter may be operating, said method comprising the steps of:

in response to receipt of a connection request from the calling adapter, a) starting a first timer period T1, b) sending a series of bits conforming to a predetermined first bit pattern through the network to the calling adapter, and c) initiating the monitoring of data received through the network for the presence of a series of bits conforming to a predetermined second bit pattern; in response to receipt of a series of bits conforming to the second bit pattern prior to the end of the first timer period T1, a) starting a second timer period T2, b) initiating the monitoring of data received through the network for the presence of a series of bits conforming to the first bit pattern and c) responding to the receipt of a series of bits conforming to the first bit pattern prior to the expiration of the time period T2 by initiating data synchronization to enable the calling and the called terminal adapters to exchange data at the first of the two possible speeds;

in response to the expiration of the timer period T1 without receipt of a series of bits conforming to the second bit pattern, starting a third timer period T3 and initiating the monitoring of data received through the network for a series of bits conforming to a predetermined third bit pattern;

in response to receipt of a series of bits conforming to the predetermined third predetermined bit pattern during the period T3, initiating data synchronization to permit the calling and the called terminal adapters to exchange data at the second of the two possible speeds; and in response to the expiration of the time period T3 without receipt of a series of bits conforming to the predetermined third bit pattern, initiating data synchronization to permit the calling and called terminal adapters to exchange data at the first of the two possible speeds.

2. A method as set forth in claim 1 wherein the first bit pattern consists of repeated 1 bit signals while the second bit pattern consists of repeated 0 bit signals.

3. A method as set forth in claim 2 wherein the predetermined third bit pattern consists of a number of n bytes with a first bit of every byte being set to a 1.

4. For use in a data communication network in which each user is connected to the network through a terminal adapter, a method performed by a called terminal adapter for automatically configuring its speed to one of the two possible speeds at which a calling adapter may be operating, said method comprising the steps of:

in response to receipt of a connection request from the calling adapter, a) starting a first timer period T1, b) sending a series of bits conforming to a predetermined first bit pattern through the network to the calling adapter, and c) initiating the monitoring of data received through the network for the presence of a series of bits conforming to a predetermined second bit pattern;

in response to receipt of a series of bits conforming to the second bit pattern prior to the end of the first timer period T1, a) starting a second timer period T2, b) initiating the monitoring of data received through the network for the presence of a series of bits conforming to the first bit pattern and c) responding to the receipt of a series of bits conforming to the first bit pattern prior to the expiration of the time period T2 by initiating data synchronization to enable the calling and the called terminal adapters to exchange data at the first of the two possible speeds;

in response to the expiration of the timer period T1 without receipt of a series of bits conforming to the second bit pattern, starting a third timer period T3 and initiating the monitoring of data received through the network for a series of bits conforming to a predetermined third bit pattern;

in response to receipt of a series of bits conforming to the predetermined third predetermined bit pattern during the period T3, starting a fourth timer period T4 and testing the received bits for an additional occurrence of a series of bits conforming to the third bit pattern, and responding to the additional occurrence by initiating data synchronization to permit the calling and the called terminal adapters to exchange data at the second of the two possible speeds; and in response to the expiration of the time period T4 without receipt of series of bits conforming to the predetermined third bit pattern during both the time period T3 and the time period T4, initiating data synchronization to permit the calling and called terminal adapters to exchange data at the first of the two possible speeds.

5. A terminal adapter capable of automatically configuring its own speed to one of two possible speeds used by a calling adapter which can communicate with the terminal adapter through an interposed network, said terminal adapter comprising:

first means for sending a CONNECT message to the calling adapter through the network;

second means for setting its initial speed to the higher of the two possible speeds;

third means for starting a first timer period T1 and for sending bits conforming to a predetermined first bit pattern through the network to the calling adapter;

fourth means for testing data received through the network for a series of bits conforming to a predetermined second bit pattern and, in response to detection of such series of bits during the timer period T1, for starting a second timer period T2 and for initiating testing of data received through the network for a series of bits conforming to the predetermined first bit pattern;

fifth means responsive to detection of a series of bits conforming to the first bit pattern during the timer period T2 for initiating data synchronization at the higher of the two possible speeds; and sixth means responsive to the absence of a series of bits conforming to the second bit pattern during the time period T1 for initiating data synchronization at the lower of the two possible speeds.

6. A terminal adapter as set forth in claim 5 wherein the sixth means further comprises:

means for initiating a third timer period T3 and for monitoring received data for a series of bits conforming to a predetermined third bit pattern; and means responsive to the detection of bits conforming to the predetermined third bit pattern during the third time period T3 to initiate adapter operation at the lower of the two possible speeds.

* * * * *